United States Patent Office 3,338,488
Patented Aug. 29, 1967

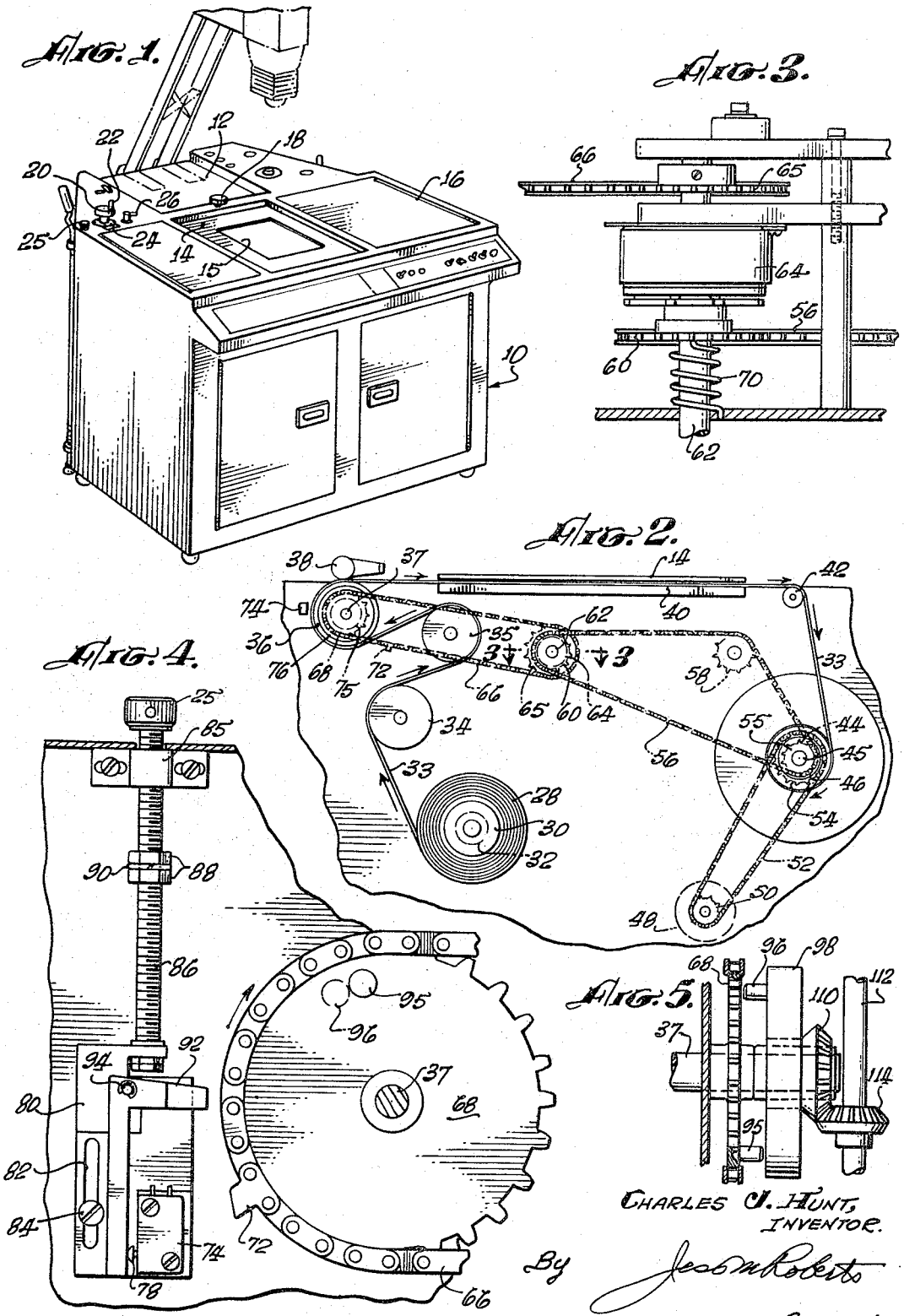

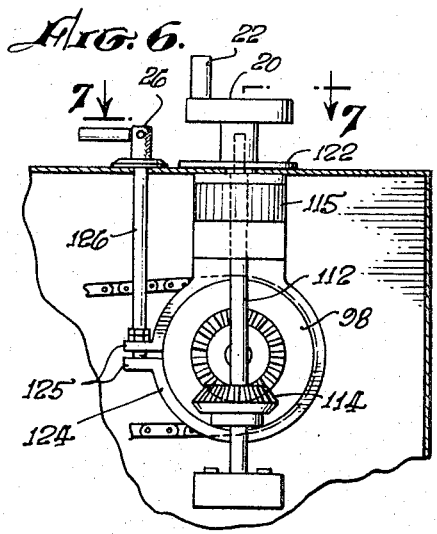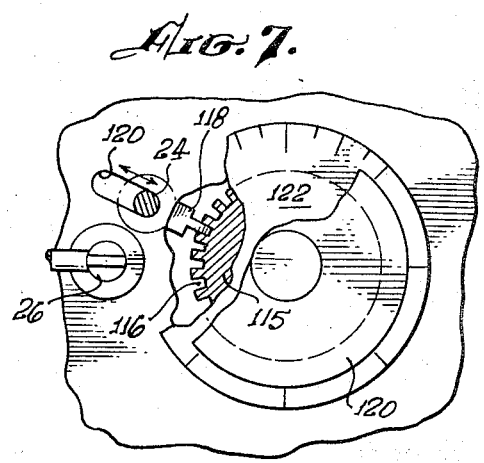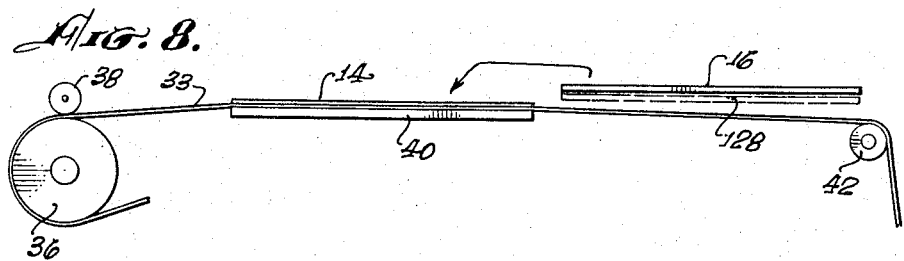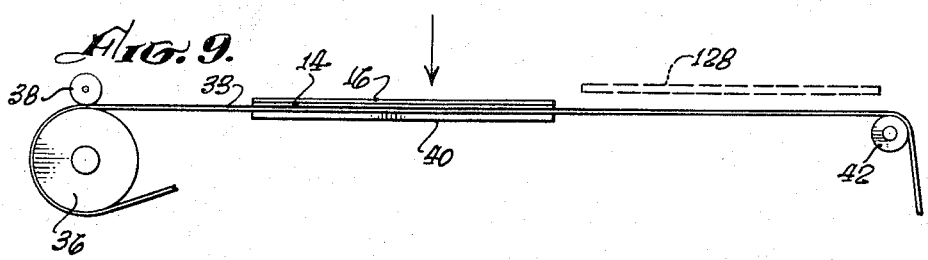

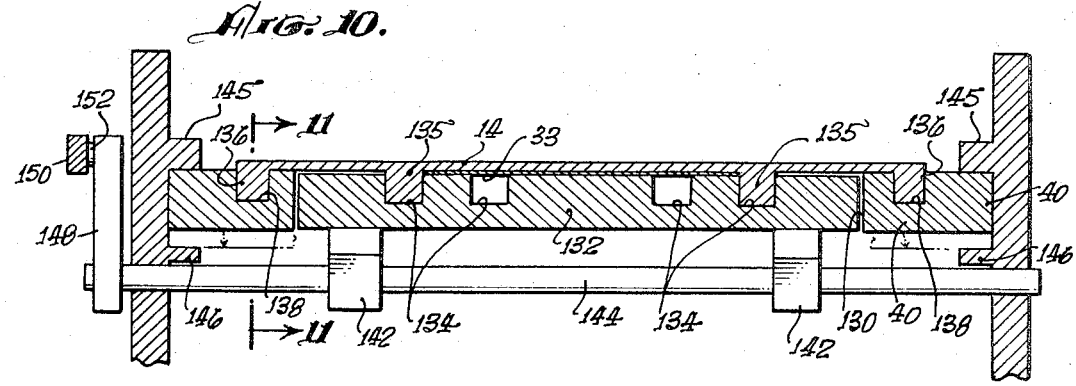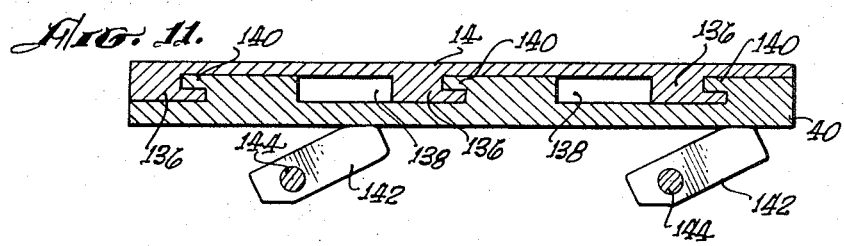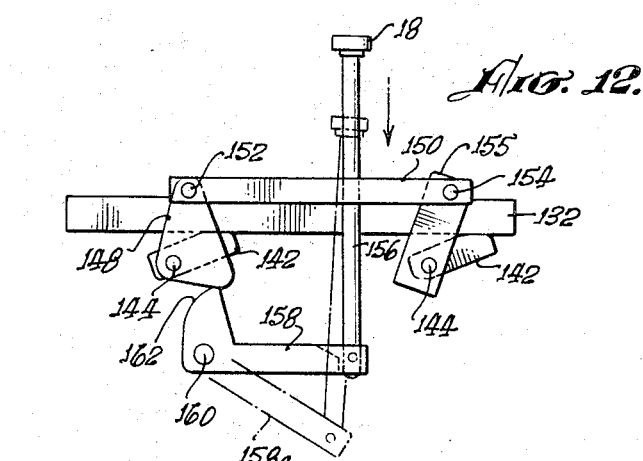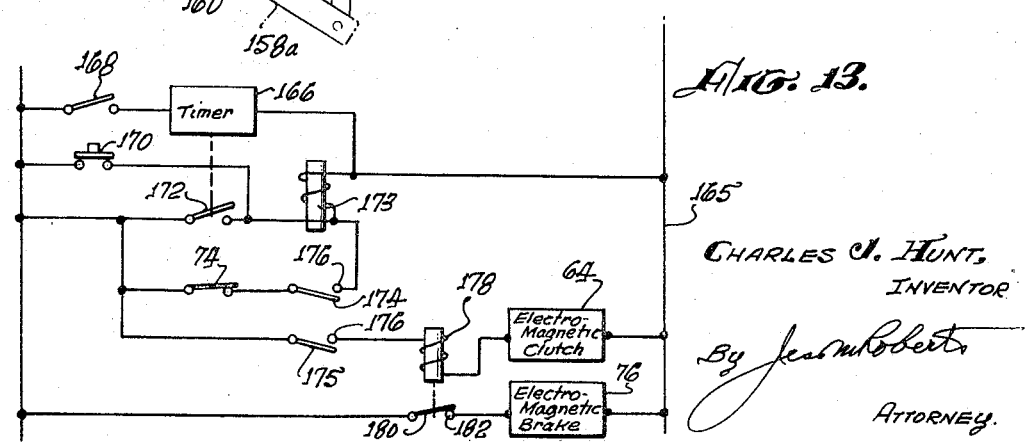

3,338,488
AUTOMATIC PHOTOGRAPHIC EASEL
Charles J. Hunt, Orange, Calif., assignor to Beattie-Coleman, Inc., Anaheim, Calif., a corporation of California
Filed Aug. 6, 1964, Ser. No. 387,827
13 Claims. (Cl. 226—136)

This invention relates to an easel for a photographic enlarger and, more particularly, relates to an easel mechanism for controlled exposure of light-sensitive paper and for automatically periodically advancing the paper by adjustable predetermined increments.

Efficient economical mass production of enlarged photographs wherein numerous duplicate prints are made from successive negatives, requires automation and the use of a large supply roll of light-sensitive paper. When a series of duplicate enlargements are to be produced, the automation apparatus should automatically time the successive exposures and automatically advance the paper between exposures to produce the predetermined number of successive duplicate prints. The apparatus should be easily and quickly adjustable for varying the exposure periods and for varying the increments of advance of the sheet material. In addition, provision should be made for quick changeover from one mask size to another and for quick focusing for each new negative.

The invention meets all of these requirements by providing a novel adjustable automatic mechanism for advancing the paper and by further providing means to facilitate rapid focusing of the enlarger on the plane of the intermittently advanced sheet.

Generally described, the mechanism for periodically advancing the paper includes: a metering roll driven by a sprocket chain; a normally deenergized clutch to drive the sprocket chain in one direction; spring means to return the sprocket chain in the opposite direction; a limit switch operated by a lug on the sprocket chain to disengage the clutch to terminate the advance of the sprocket chain; brake means to immobilize the metering roll when the clutch is disengaged; and stop means to limit the return movement of the sprocket chain. Gross adjustment of the magnitude of the paper advance is accomplished by shifting the return stop means by discrete increments and fine adjustment is accomplished by minute control over the position of the limit switch. As will be explained, the invention includes special provisions to eliminate backlash and drift with respect to the adjustment of the return stop means.

The apparatus provides a platen assembly which, as usual, includes a mask above the intermittently advanced paper and a pressure plate below the paper to keep the paper in contact with the mask. Quick focusing when required is made possible by two provisions. The first provision is a focusing plate to be temporarily placed on the mask for a focusing operation. The second provision is a mechanism for temporarily lowering the platen to bring the surface of the superimposed focusing plate into the normal plane of the paper.

The features and advantages of the invention may be understood from the following detailed description together with the accompanying drawings.

In the drawings, which are to be regarded as merely illustrative:

FIG. 1 is a perspective view of the initial embodiment of the invention;

FIG. 2 is a diagram showing the path of paper travel together with a sprocket chain drive to intermittently advance the paper;

FIG. 3 is a simplified plan view of a pair of sprockets together with an electromagnetic clutch to interconnect the sprockets for driving one sprocket in one direction and a torque spring for returning the one sprocket in the opposite direction;

FIG. 4 is an elevational view of an adjustable limit switch assembly together with an adjacent sprocket for a drive chain carrying a lug for operation of the limit switch;

FIG. 5 is an elevational view of the sprocket shown in FIG. 4 together with a functionally associated metering disk;

FIG. 6 is a simplified elevational view of the mechanism for adjusting the metering disk of FIG. 5;

FIG. 7 is a fragmentary plan view of a metering dial with a portion broken away to show an underlying metering drum, both of which are included in the mechanism for adjusting the metering disk of FIGS. 5 and 6;

FIG. 8 is a diagrammatic view showing the platen and mask at their normal elevated positions and also showing a retracted focusing plate;

FIG. 9 is a similar view with the focusing plate resting on the mask and with the mask and platen temporarily lowered to place the focusing plate in the normal plane of the intermittently advanced paper;

FIG. 10 is a diagrammatic sectional view of the platen assembly with exaggerated dimensions;

FIG. 11 is a section along the line 11—11 of FIG. 10;

FIG. 12 is a simplified elevational view of the control mechanism for raising and lowering the platen assembly; and FIG. 13 is a simplified wiring diagram of the circuitry for controlling the intermittent advance of the paper.

*General arrangement*

The present embodiment of the invention shown in perspective in FIG. 1 has a housing 10 that encloses the moving parts. The upper side of the apparatus includes a sunken platform 12 for mounting a conventional upright enlarger.

FIG. 1 further shows a printing mask 14 with a rectangular opening 15, the mask being one of an interchangeable set of masks for printing photographs of different sizes. Adjacent the printing area represented by the mask 14 is a focusing panel 16 shown in its idle or retracted position.

Also accessible on the upper side of the housing are a number of controls, the following of which are pertinent to the present invention: a platen control knob 18 which may be depressed to lower the mask 14 for a focusing procedure which involves the placing the focusing panel 16 on the mask; a metering knob 20 provided with a crank 22 for gross adjustment of the extent of intermittent travel of the light-sensitive paper; a detent pin 24 of a detent or latch that normally immobilizes the metering knob; a knob 25 for fine adjustment of the extent of the intermittent travel of the light-sensitive paper; and a locking knob 26 for immobilizing the metering mechanism against drift and backlash.

As shown diagrammatically in FIG. 2, a supply roll 28 of the light-sensitive paper is mounted on a spindle 30 that is equipped in a well known manner with a friction device or brake 32 to provide a desirable degree of resistance to unwinding of the supply roll. The strip of paper from the supply roll 28 passes around a guide roller 34 and an idler roller 35 to reach a metering drum 36 and a cooperating roller 38 that presses the paper against the metering drum. From the metering roll 36 the paper 33 passes between a platen 40 and the previously mentioned printing mask 14 and then changes direction around an idler roller 42 to reach a take-up roll on a take-up shaft 45. The take-up shaft 45 is normally continuously rotated and is operatively connected to the take-up roll 44 in a well known manner by a friction connection or clutch 46 to cause the take-up roll to wind up the paper as fast as the paper is released by the metering drum.

A suitable continuously running motor 48 actuates a drive sprocket 50 which is connected by a sprocket chain 52 to a driven sprocket 54 that is keyed to the take-up shaft 45. A second sprocket 55 on the take-up shaft 45 is connected by a sprocket chain 56 to an idler sprocket 58 and a continuously running drive sprocket 60 which is keyed to a counter-shaft 62. Whenever advance of the metering drum 36 is required, the continuously running countershaft 62 is connected by an electromagnetic clutch 64 (FIG. 3) to a sprocket 65 that is journaled on the countershaft for independent rotation. Sprocket chain 66 connects the sprocket 65 with a sprocket 68 that is on the shaft 37 of the metering drum 36.

When the sprocket 65 is actuated by the electromagnetic clutch 64 it rotates in opposition to a torque spring 70 (FIG. 3) and stores energy in the torque spring to cause the sprocket to rotate back to its starting position whenever it is released by the electromagnetic clutch. As will be explained in detail later, the starting position of the sprocket 65 is determined by stop means associated with the sprocket 68 and the extent to which the sprocket 65 is rotated by energization of the electromagnetic clutch is determined by a lug 72 on the sprocket chain 66 which moves against a limit switch 74 to deenergize the electromagnetic clutch. As also will be explained, gross adjustment of the extent of rotation of the metering drum 36 is accomplished by adjustment of the starting position of the sprocket chain 66, i.e., the starting positions of the two sprockets 65 and 68 and fine adjustment of the extent of rotation of the metering drum is accomplished by fine adjustment of the position of the limit switch 74.

Briefly and generally described, the operation of the apparatus is as follows. With a selected printing mask 14 in operating position, the platen control knob 18 is depressed to lower the platen 40 along with the mask and then the focusing panel 16 is placed on the mask 16 with the upper surface of the focusing panel in the plane that is normally occupied by the light-sensitive paper that travels between the platen and the mask. The image projected by the enlarger is focused on the focusing panel 16. The focusing easel 16 is then restored to its idle position and the platen 40 is elevated back to its normal level.

Then the appropriate controls are manipulated to determine the amount that the light-sensitive paper will be advanced on each operating cycle of the apparatus. For this purpose the locking knob 26 is reversely rotated to free the metering mechanism and the detent pin 24 is manually displaced against spring pressure to unlatch the metering knob 20. The metering knob 20 is rotated by means of the crank 22 for gross adjustment of the length of paper travel, the adjustment being accomplished in increments of ½ inch. Then the detent pin 24 is released to latch the metering knob 20 and the locking knob 26 is again tightened to lock the metering mechanism against drift and backlash. If further fine adjustment is required the knob 25 is rotated for slight shift of the limit switch 74.

When the electromagnetic clutch 64 (FIG. 3) is energized either by a manual switch or by an automatic timer, the electromagnetic clutch connects the continuously rotating drive sprocket 60 to the sprocket 65 to actuate the sprocket chain 66 for rotating the metering drum 36. The metering drum 36 continues to rotate until the control lug 72 on the sprocket chain 66 reaches the limit switch 74 to deenergize the electromagnetic clutch 64. When the electromagnetic clutch 64 is deenergized, the torque spring 70 acting on the sprocket 65 returns the sprocket chain 66 to its starting position.

The metering drum 36 is operatively connected to the shaft 37 by means of a one-way clutch 75, indicated in dotted lines in FIG. 2, so that the metering drum is not affected by reverse rotation of the shaft 37 by the sprocket 68. Associated with the metering drum is an electromagnetic brake indicated at 76 of a well known type which is electrically interlocked with the electromagnetic clutch 64 to be energized automatically to immobilize the metering drum in response to deenergization of the electromagnetic clutch.

*Means to adjust the extent of the periodic rotation of the metering drum*

The adjustable control mechanism is shown in FIGS. 4, 5, 6 and 7.

FIG. 4 shows the sprocket 68 on the shaft 37 that carries the metering drum 36. The view further shows the sprocket chain 66 and the limit switch 74 that is operated by the control lug 72 on the sprocket chain. The limit switch 74 which has an operating button 78 is mounted on a vertically movable bracket 80 which is provided with a vertical slot 82 in engagement with a fixed guide stud 84. The bracket 80 is adjustably suspended from a fixed screw-threaded support collar 85 by a long screw 86 which is rotatably connected to the upper end of the bracket. The long screw 86 is provided with the previously mentioned knob 25 on the top of the apparatus, the long screw being rotated by the knob for vertical adjustment of the limit switch. The knob 25 abuts the support collar 85 at the lower limit of the range of adjustment of the limit switch and a pair of nuts 88 and an intervening lock washer 90 on the long screw 86 function as a stop to abut the support collar at the upper limit of the range of adjustment. For operation of the limit switch 74 a bellcrank 92 is mounted on the bracket 80 by a pivot 94 with one arm of the bellcrank adjacent the switch button 78 and with the other arm in the path of travel of the lug 72 on the chain 66.

As heretofore stated, when the limit switch 74 is opened by the travel of the lug 72 against the bellcrank 92, the previously mentioned electromagnetic clutch 64 is deenergized to permit the chain 66 that carries the lug to be returned to its starting position. When the torque spring 70 acting on the previously mentioned sprocket 65 returns the sprocket chain 66 to its starting position, the starting position is determined by abutment of a lateral stop pin 95 (FIGS. 4 and 5) on the sprocket 68 against an adjustable fixed stop pin 96 that is shown in phantom in FIG. 4. Thus when the electromagnetic clutch 64 is energized, the lateral stop pin 95 is moved away from the fixed stop pin 96 and when the limit switch 74 is opened the stop pin 95 returns to its starting position in abutment with the associated stop pin 96.

As shown in FIG. 5, the adjustably fixed stop pin 96 extends laterally from a metering disk 98 that is located adjacent the sprocket 68. The metering disk 98 is rotatably mounted on the previously mentioned shaft 37 that fixedly carries both the sprocket 68 and the metering drum 36. For adjustment of the stop pin 96 around its circle of adjustment, a bevel gear 110 is carried by the metering disk 98 for actuation by the adjustment mechanism shown in FIG. 6.

In FIG. 6 a suitably journaled vertical adjustment shaft 112 carries a bevel gear 114 in mesh with the bevel gear 110, the adjustment shaft being rotatably adjusted by the previously mentioned metering knob 20 (FIG. 6) which is united therewith and which carries the previously mentioned crank 22. The adjustment shaft 112 carries what may be termed a detent wheel 115 which, as shown in FIG. 7, has a circumferentially series of equally spaced peripheral radial slots 116 for selective engagement by an associated detent member 118 to latch the detent wheel at various positions of adjustment. The detent member 118 is biased towards the detent wheel 115 by a suitable spring (not shown) and is provided with the previously mentioned detent pin 24 which extends upright through a guide slot 120.

The detent wheel 115 is concealed by an overlying fixed dial 122 which is fixedly connected to the detent wheel to rotate therewith. As shown in FIG. 7, the dial 122 has a circular peripheral scale corresponding to the radial slots 116 of the detent wheel 115, the circular scale designing inches of advance of the sensitive paper on each cycle. The scale is in increments of ½ inch and the detent member 118 serves as an index for adjustment of the scale. Thus for gross adjustment of the inches of paper advance by each operation of the metering drum 36, the detent 118 is manually retracted by means of the detent pin 24 and the metering knob 20 is rotated by the crank 22 to place the desired graduation of the dial opposite the detent member.

A feature of the invention is the provision of a brake band 124 surrounding the metering disk 98 to releasably immobilize the metering disk to maintain any given adjustment of the stop pin 96. The provision of the brake band prevents drift of the stop pin 96 and solves the problem of backlash in the adjustment mechanism. The brake band 124 terminates in a pair of cooperating ears 125 and is tightened by rotation of an upright control shaft 126 the upper end of which carries the previously mentioned locking knob 26. When the control shaft 126 is rotated clockwise it tightens the brake band 124 by screw action between the two ears 125.

*The structure to provide for quick focusing*

The diagram in FIG. 8 shows the platen 40 carrying the mask 14 with the platen in its normal upper operating position and the diagram in FIG. 9 shows the platen in its alternate lower position to which it is shifted by manual depression of the platen control knob 18. In its upper position shown in FIG. 8, the platen slightly deflects the paper 33 upward, the paper being slackened temporarily when the platen is temporarily lowered.

In FIG. 8 the focusing panel 16 is in its idle or retracted position on suitable support rails which are indicated by dotted lines as 128. In FIG. 9 the focusing panel 16 has been shifted from its idle or retracted position to its operating position resting on the mask 14. The plane of the upper surface of the focusing panel in FIG. 9 is the same as the plane of the upper surface of the paper 33 in FIG. 8. Thus the distance that the platen is lowered in FIG. 9 is equal to the combined thicknesses of the mask 14 and the focusing panel 16.

FIGS. 10 and 11 are diagrammatical views with disproportionate dimensions to facilitate understanding of the structure involved in the quick focusing operation.

Referring to FIG. 10 the platen 40 is a heavy plate with a rectangular opening 130 to provide working space for the usual pressure plate 132 which holds the intermittently advanced paper 33 snug against the underside of the associated mask 14. The upper surface of the pressure plate 132 has a plurality of spaced longitudinal grooves 134 to mate selectively with longitudinal ribs on the undersides of the various cutting mask 14, which rails serve as guides to confine the various widths of paper that may be employed. In FIG. 10 the particular mask 14 that is in use has a pair of such guide ribs 135.

Each mask 14 of the set of interchangeable masks is large enough to overhang the platen 40 on both sides of the pressure plate 132 and each mask has along each of its opposite longitudinal sides a series of locking shoes 136 (FIG. 11), there being three longitudinally aligned locking shoes on each side of the mask. Each of the locking shoes 136 slidingly fits into a corresponding groove 138 of the platen 40 in releasable engagement with a corresponding overhanging tongue 140 in the groove. It is apparent that a mask 14 may be removed from the platen simply by shifting the mask longitudinally to move the locking shoes 136 clear of the overhanging tongues 140 and then lifting the platen clear.

Normally the pressure plate 132 is under upward pressure from two pairs of pressure arms 142 which are carried by two corresponding transverse torque rods 144. The upward pressure of the pressure plate is applied to the mask 14 and the mask in turn transmits the upward pressure to the platen 40 to hold the platen in its normal upper operating position against a pair of fixed overhanging side rails 145. When the pressure arms 142 are relaxed to lower the pressure plate 132, the platen 40 falls to rest on a lower set of side rails 146.

FIG. 12 shows schematically how the two torque rods 144 are operated by the previously mentioned platen control knob 18. Keyed to one of the torque rods 144 is a triangular plate 148 which functions in the manner of a bellcrank. The plate 148 is connected to the other torque rod 144 by a pull rod 150, the pull rod being connected by a pivot 152 to the triangular plate and by a second pivot 154 to an arm 155 that is fixedly mounted on the second torque rod.

The platen control knob 18 is on a suitably guided upright control rod 156 which is pivotally connected to a lever 158 that is mounted on a pivot 160. The lever 158 has a cam surface 162 in abutment with the triangular plate 148. At the positions of the parts shown in FIG. 12, the platen control knob 18 is in its upper normal position and the cam surface 162 of the lever 158 presses against the triangular plate 148 to place the two torque rods 144 under torque load to urge the two pressure arms 142 upward against the underside of the pressure plate 132. The parts tend to stay in these positions because the cam surface 162 is rotated past center with respect to the pivot 160 of the lever 158. When the platen control knob 18 is manually depressed to swing the lever 158 downward to the dotted position shown at 158a, the cam surface 162 retracts relative to the triangular plate 148 to permit the pressure arms 142 to relax for lowering of the platen 40.

*Electrical control system*

In addition to the controls described to this point there are a number of controls which are not pertinent to the present invention, including means to control the number of successive prints in a given run and means to control the exposure cycle of the enlarger. The control system as far as it pertains to the present invention may be understood by reference to FIG. 13 in which two leads 164 and 165 represent opposite sides of a circuit.

An operating cycle for actuating the metering drum 36 may be initiated by a timer 166 which is energized by a switch 168 or, if desired, the operating cycle may be initiated by closing a pushbutton switch 170 which is in parallel with a switch 172 that is operated by the timer. The two parallel switches 170 and 172 control the energization of a relay 173 which has two normally open contactor arms 174 and 175. When the relay 173 is energized, the contactor arm 174 moves against a fixed contact 176 to form a holding circuit for the relay and the second contactor arm 175 moves against a fixed contact 176 to energize the previously mentioned electromagnetic clutch 64 and at the same time to energize a second relay 178. The relay 178 has a normally closed contactor arm 180 which cooperates with a fixed contact 182 to energize the previously mentioned electromagnetic brake 76. The previously mentioned limit switch 74 is in the holding circuit for the first relay 173.

It is apparent that when the relay 173 is energized, it remains energized until the limit switch 74 is opened to break the holding circuit. As long as the relay 173 is energized, the electromagnetic clutch 64 is energized to cause rotation of the metering drum 36 and as long as the electromagnetic clutch 64 is energized, the electromagnetic brake 76 is deenergized to release the metering drum for rotation. When the limit switch 74 breaks the holding circuit for the first relay 173, the second relay 178 is deenergized to cause release of the electromagnetic clutch 64 and simultaneous application of the electromagnetic brake 76 to immobilize hte metering drum.

My description in specific detail of the presently preferred embodiment of the invention will suggest various changes, substitutions and other departures from my disclosure within the spirit and scope of the appended claims.

I claim:
1. In a mechanism for advancing a metering roll by predetermined increments, the combination of:
   a rotary actuator to operate continuously;
   a rotary driver to operate in alternate directions;
   a first means to limit the reverse rotation of the driver to determine the starting position thereof;
   a second means to sense forward rotation of the driver to a predetermined limit position;
   a first clutch to connect the actuator with the driver for starting an operating cycle by forward rotation of the driver, the clutch being responsive to said second means to disengage when the driver rotates to the predetermined limit position;
   means to reverse the rotation of the driver to its starting position in response to disengagement of the clutch,
   at least one of the first and second means being adjustable to vary the extent of rotation of the driver; and
   a second one-way clutch operatively connecting the driver to the metering roll for rotation thereof in response to forward rotation of the driver.

2. A combination as set forth in claim 1 which includes brake means normally immobilizing the metering roll, said brake means being releasable in response to engagement of the first clutch.

3. A combination as set forth in claim 1 which includes means to adjust said first means for gross adjustment of the advance of the metering roll; and
   means to adjust the second means for finer adjustment of the advance of the metering roll.

4. A combination as set forth in claim 1 in which the means to reverse the rotation of the driver is a spring means to store energy in response to forward rotation of the driver.

5. In an apparatus having an operating cycle for periodically advancing sheet material through a processing zone by predetermined increments, the combination of:
   rotary means to carry a roll of the sheet material;
   means to yieldingly resist unwinding rotation of the rotary means;
   take-up rotary means to wind up the strip material after the strip material passes through the processing zone;
   a first power-actuated means adapted for continuous operation, said power-actuated means being yieldingly connected to the take-up rotary means to continuously urge rotation thereof;
   a metering roll engaging the sheet material for advance thereof;
   a rotary driver adapted to operate in alternate directions;
   a second power-actuated means adapted for continuous operation;
   a first clutch engageable to connect the second power-actuated means with the rotary driver for rotation thereof in one direction;
   means to release said clutch in response to a predetermined magnitude of rotation of the rotary driver;
   yielding means connected to the rotary driver for return rotation thereof in the opposite direction;
   a second one-way clutch operatively connecting the rotary driver with the metering roll for rotation thereof in one of the alternate directions; and
   brake means responsive to said first clutch to immobilize the metering roll against reverse rotation when the first clutch is disengaged.

6. In an apparatus having an operating cycle for periodically advancing sheet material through a processing zone by predetermined increments, the combination of:
   a first sprocket;
   a second sprocket;
   a continuous sprocket chain interconnecting the two sprockets for synchronous rotation;
   a first means to limit rotation of one of the two sprockets in one direction to determine the starting positions of the two sprockets for starting the operating cycles;
   a control element carried by the sprocket chain for travel therewith;
   a second means to sense arrival of the control element at a predetermined limit position by rotation of the two sprockets in the opposite direction;
   a rotary actuator adapted to operate continuously;
   a first clutch engageable to connect the actuator with one of the two sprockets for rotation thereof in said opposite direction;
   means to engage the first clutch to start the operating cycle by rotating the two sprockets in said opposite direction, the first clutch being responsive to said second means to disengage when the control element reaches the predetermined limit position;
   means to reverse the rotation of the two sprockets to their starting positions in response to disengagement of the first clutch,
   at least one of said first and second means being adjustable to vary the extent of rotation of the two sprockets;
   metering means engaging the sheet material for periodic advance thereof; and
   a second one-way clutch operatively connecting the two sprockets to the metering means for actuation of the metering means in response to rotation of the two sprockets in one of the two directions.

7. A combination as set forth in claim 6 which includes brake means normally immobilizing the metering means, said brake means being releasable in response to engagement of the first clutch.

8. A combination as set forth in claim 6 in which said first means comprises:
   a first stop positioned eccentrically on said one of the two sprockets for movement therewith in a circular orbit; and
   a second stop in the orbital path of the first stop to block movement thereof to determine the starting position of the one sprocket, the second stop being adjustable around the orbital path to vary the starting position of the one sprocket.

9. A combination as set forth in claim 6 in which said second means is a limit switch in the path of the control element for operation thereby.

10. In an apparatus having an operating cycle for periodically advancing sheet material through a processing zone by predetermined increments, the combination of:
    a first sprocket;
    a second sprocket;
    a continuous sprocket chain interconnecting the two sprockets for synchronous rotation;
    a rotary actuator adapted to operate continuously;
    a first clutch engageable to connect the actuator with one of the two sprockets for rotation of the two sprockets in one direction;
    a first stop positioned eccentrically on one of the two sprockets for movement therewith in an orbital path;
    a second stop in the orbital path of the first stop to block movement thereof in the opposite direction to determine the starting positions of the two sprockets;
    a control element carried by the sprocket chain for travel therewith;
    means at a predetermined point in the path of travel of the control element when the sprockets rotate in said one direction to sense the arrival of the control element at the point;
    means to engage the first clutch to start the operating cycle by rotating the two sprockets in said one direction, the first clutch being responsive to said sensing means to disengage when the control element reaches the predetermined point;
    means to reverse the rotation of the two sprockets to their starting positions in response to disengagement of the first clutch;

metering means engaging the sheet material for periodic advance thereof;

a second one-way clutch operatively connecting the two sprockets to the metering means for actuation of the metering means in response to rotation of the two sprockets in one direction;

means to adjust the second stop around the orbital path to vary the starting positions of the two sprockets; and means to adjust the sensing means along the path of the control element to vary the location of said point.

11. A combination as set forth in claim 10 in which the means to adjust the second stop is operable by relatively large uniform increments for gross adjustment of the extent of rotation of the two sprockets; and in which the sensing means is adjustable by relatively small increments for fine adjusting of the extent of rotation of the two sprockets.

12. A combination as set forth in claim 10 which includes screw means for fine adjustment of the sensing means along the path of the control element.

13. A combination as set forth in claim 10 in which said sensing means is a limit switch for operation by the control element.

References Cited

UNITED STATES PATENTS

| | | | |
|---|---|---|---|
| 1,105,036 | 7/1914 | Mukautz | 226—120 |
| 1,551,415 | 8/1925 | Marcellus | 242—67.3 |
| 1,867,596 | 7/1932 | Roseman | 242—67.2 |
| 2,318,616 | 5/1943 | Mayer | 88—24 |
| 2,334,137 | 11/1943 | Wagner et al. | 192—139 |
| 2,737,278 | 3/1956 | Bartelt | 192—142 X |
| 2,984,012 | 5/1961 | Groll | 226—134 X |
| 3,073,499 | 1/1963 | Middleton | 226—120 |
| 3,139,791 | 7/1964 | Bailey | 88—24 |
| 3,145,892 | 8/1964 | Herrmann | 226—134 X |

M. HENSON WOOD, JR., *Primary Examiner.*

NORTON ANSHER, *Examiner.*

H. H. FLANDERS, J. N. ERLICH, *Assistant Examiners.*